United States Patent
Arigo et al.

(10) Patent No.: US 9,574,055 B2
(45) Date of Patent: *Feb. 21, 2017

(54) COMPATIBILIZED SILICA WITH A PLURALITY OF SILANES AND A POLYMER SILICA-REINFORCED MASTERBATCH

(75) Inventors: Mark Arigo, Baton Rouge, LA (US); Subir Debnath, Baton Rouge, LA (US)

(73) Assignee: LION COPOLYMER HOLDINGS, LLC, Geismar, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/594,623

(22) Filed: Aug. 24, 2012

(65) Prior Publication Data
US 2013/0203915 A1    Aug. 8, 2013

Related U.S. Application Data

(60) Provisional application No. 61/594,259, filed on Feb. 2, 2012.

(51) Int. Cl.
*C07F 7/08* (2006.01)
*C08J 3/22* (2006.01)
*C08K 9/06* (2006.01)

(52) U.S. Cl.
CPC .. *C08J 3/22* (2013.01); *C08K 9/06* (2013.01); *C08J 2321/00* (2013.01)

(58) Field of Classification Search
CPC ................................. C07F 7/18; C08K 5/548
USPC ........................................................ 523/213
See application file for complete search history.

(56) References Cited

U.S. PATENT DOCUMENTS

| | | | |
|---|---|---|---|
| 2,384,543 A | 9/1945 | Fryling |
| 3,055,956 A | 9/1962 | Paulsen |
| 3,317,458 A | 5/1967 | Clas et al. |
| 3,686,113 A | 8/1972 | Burke, Jr. |
| 3,767,605 A | 10/1973 | Gerlicher |
| 3,907,734 A | 9/1975 | Broeck et al. |
| 4,076,769 A | 2/1978 | Watts |
| 4,104,323 A | 8/1978 | Hansen |
| 4,213,888 A | 7/1980 | Karg et al. |
| 4,481,329 A | 11/1984 | Ambler et al. |
| 4,482,657 A | 11/1984 | Fischer et al. |
| 5,093,407 A | 3/1992 | Komai et al. |
| 5,304,591 A | 4/1994 | Nowakowsky et al. |
| 5,405,897 A | 4/1995 | Segatta et al. |
| 5,504,168 A | 4/1996 | Maestri et al. |
| 5,763,388 A | 6/1998 | Lightsey et al. |
| 5,985,953 A | 11/1999 | Lightsey et al. |
| 6,197,384 B1 | 3/2001 | Schubert et al. |
| 6,346,579 B1 | 2/2002 | Zanzig et al. |
| 6,403,693 B2 | 6/2002 | Materne et al. |
| 6,579,929 B1 | 6/2003 | Cole et al. |
| 6,635,700 B2 | 10/2003 | Cruse et al. |
| 6,921,785 B2 | 7/2005 | Campbell et al. |
| 7,335,807 B2 | 2/2008 | Hochgesang |
| 7,585,914 B2 | 9/2009 | Tsou et al. |
| 2004/0071626 A1 | 4/2004 | Smith et al. |
| 2005/0256267 A1 | 11/2005 | Hochgesang |
| 2006/0100320 A1 | 5/2006 | Dalphond et al. |
| 2007/0106024 A1 | 5/2007 | Tsou et al. |
| 2007/0260005 A1 | 11/2007 | Karato et al. |
| 2008/0221274 A1 | 9/2008 | Jourdain |
| 2008/0293889 A1 | 11/2008 | Obrecht |
| 2009/0099309 A1 | 4/2009 | Gumbs |
| 2009/0124730 A1 | 5/2009 | Matsuda et al. |
| 2009/0137716 A1 | 5/2009 | Furukawa et al. |
| 2010/0022684 A1 | 1/2010 | Wallen et al. |
| 2010/0179249 A1 | 7/2010 | Schomaker et al. |
| 2011/0165356 A1 | 7/2011 | Harris et al. |
| 2011/0166262 A1 | 7/2011 | Harris et al. |
| 2011/0166263 A1 | 7/2011 | Rikhoff et al. |
| 2011/0166265 A1 | 7/2011 | Harris et al. |

FOREIGN PATENT DOCUMENTS

| | | |
|---|---|---|
| CA | 1242832 | 10/1988 |
| CA | 2724798 | 1/2010 |
| DE | 1188797 | 3/1965 |
| EP | 849 320 | * 6/1998 |
| JP | 2005-33019 | 12/2005 |

\* cited by examiner

*Primary Examiner* — Kuo-Liang Peng
(74) *Attorney, Agent, or Firm* — Buskop Law Group, PC; Wendy Buskop

(57) ABSTRACT

A compatibilized silica for incorporation into natural and synthetic polymers in latex form using precipitated or fumed silica with at least two organosilicon coupling compounds in an aqueous suspension. Polymer-silica reinforced masterbatches are prepared by addition of the compatibilized silica slurry using the formed compatibilized silica.

7 Claims, No Drawings

COMPATIBILIZED SILICA WITH A PLURALITY OF SILANES AND A POLYMER SILICA-REINFORCED MASTERBATCH

CROSS REFERENCE TO RELATED APPLICATIONS

The present application claims priority to and the benefit of U.S. Provisional Patent Application Ser. No. 61/594,259 filed on Feb. 2, 2012, entitled "FUNCTIONALIZED SILICA FOR RUBBER MASTERBATCH." This reference is hereby incorporated in its entirety.

FIELD

The present embodiments generally relate to compatibilized silica with a plurality of silanes for incorporation into natural and synthetic polymers in latex form or dry blending operations.

BACKGROUND

Silica and carbon black have been commonly used as reinforcing agents and/or fillers in rubber and thermoplastic polymers. A number of techniques have been developed to incorporate such reinforcing agents and fillers into the polymer compositions, including both wet and dry blending processes. The incorporation of silica and carbon black as reinforcing agents and/or fillers is far more complex than might otherwise appear. One problem in wet blending of silica with water-based lattices of such polymers arises from the fact that the hydrophilic silica has a tendency to associate with the aqueous phase and not blend uniformly with the hydrophobic polymer.

Perhaps the most commonly employed practice, used commercially, is the technique of dry blending either silica, carbon black, or both into rubber or thermoplastic polymers in a high-shear mixer. This practice has many limitations. Notable among them include the tendency of the filler particles to agglomerate with each other, resulting in a non-uniform dispersion of the filler throughout the polymer constituting the continuous phase. Another problem commonly experienced in such high-shear mixing operations is the tendency of the polymers to degrade, or break down, during processing. This necessitates the use of higher molecular weight polymers, which sometimes require the incorporation of various types of processing aids to facilitate the mixing and dispersion of the filler particles into the polymer constituting the continuous phase. The cost associated with the use of such processing aids also increases the manufacturing cost of the polymeric compound or article. The use of processing aids has the further disadvantage in that such processing aids may have a negative effect on the cure or end-use properties of the polymeric compound or article. In addition, dry blending techniques add additional processing costs due to excessive equipment wear caused by the abrasive fillers.

To improve dispersion of the silica during dry mixing, it has been proposed that such compounding operations employ silica that has been pre-treated with an organosilane coupling agent having dual functionality. Representative of such coupling agents are those well-known compounds that include both an organic group, along with a readily hydrolyzable group, such as an alkoxy group as represented by a methoxy group or an ethoxy group likewise bonded directly to the silicon atom. In those systems, it is generally recognized that the alkoxy group hydrolyzes in the presence of moisture typically found on the surface of the silica to form the corresponding silanol that reacts with or condenses in the presence of the silica surface to bond the silicon atom to the silica surface. The polymer matrix may become chemically bonded by means of the coupling agent to the silica surface during cure or vulcanization of the polymer. Problems associated with the use of such silanes during compounding include the release of volatile organic compounds (VOC) due to the hydrolysis of the readily hydrolysable groups, unpleasant odors due to the presence of mercapto or sulfur containing organic groups, and premature curing and/or scorching. A need exists to provide a process that allows for the incorporation of silica into natural or synthetic polymers during the latex stage that overcomes the foregoing disadvantages.

There is a need to provide a process for the incorporation of silica reinforcing filler alone or with other fillers, particularly carbon blacks, into natural and synthetic polymers during the latex stage that is simple and inexpensive.

Another need is to provide a process for the incorporation of silica reinforcing filler alone or with other fillers, particularly carbon blacks, into natural and synthetic polymers such that the silica can be substantially—uniformly dispersed throughout the polymer matrix, and such that the silica can functionalized to react with the polymer matrix during processing or curing for end use compound or article.

A need also exists for a wet process for treating precipitated or fumed silica with a coupling agent whereby it becomes compatible with the natural or synthetic polymer phase of a polymer latex.

The present embodiments meet these needs.

BRIEF DESCRIPTION OF THE DRAWINGS

N/A

DETAILED DESCRIPTION OF THE EMBODIMENTS

Before explaining the present process in detail, it is to be understood that the process is not limited to the particular embodiments and that it can be practiced or carried out in various ways.

The present embodiments generally relate to compatibilized silica with a plurality of silanes for incorporation into natural and synthetic polymers in latex form or dry blending operations.

The present embodiment further relate to compatibilized silica formed by the reaction of precipitated or fumed silica with a plurality of organosilicon coupling compounds in aqueous suspension. Polymer-silica reinforced masterbatches can be prepared by addition of the compatibilized silica slurry to natural and synthetic polymer lattices The present embodiments relate to an improved process for the manufacture of silica-filled masterbatches of natural and synthetic rubber and thermoplastic polymers, particularly to those polymers prepared by emulsion polymerization processes, and to an improved process for the uniform incorporation of a compatibilized silica slurry into such polymers at the latex stage. These embodiments further relate to the compatibilized silica obtained from the compatibilized silica slurry process and polymer compositions containing this compatibilized silica.

The compatibilized silica slurry can then be blended with the natural or synthetic polymer latex whereby the silica is substantially uniformly distributed through the polymer latex and does not alter the physical state of the polymer particles in such latex, thus permitting the incorporation into said latex of other processing chemicals, such as fillers like carbon black, plasticizers, processing oils, and antioxidants.

The silica can be incorporated into and adheres to the polymer after coagulating the latex whereby the silica becomes substantially uniformly distributed throughout the polymer particles as fillers and/or reinforcement therefor without altering the performance of other processing chemicals.

The process can be used with any natural or synthetic polymer made into latex form.

The process can be used for natural and synthetic rubber lattices and for incorporation into a continuous or batch emulsion polymerization process at the latex stage.

The emulsion polymerization process can be used in embodiments which have been modified for incorporation of carbon black slurry into the latex.

A benefit of this invention is using two silane coupling agents with silica to independently control both the coupling between the polymer and filler for end use properties, and the hydrophobicity of the silica for improved incorporation into the polymer when coagulated with polymer lattices.

A benefit of this invention is using two silane coupling agents with silica to reduce the amount of sulfur-containing silanes in a final rubber formulation, such as a styrene-butadiene rubber formulation.

Another benefit of this invention is that tensile strength of a final rubber formulation is expected to exhibit improved characteristics by using at least two silane coupling agents, simultaneously.

Still another benefit of this invention is that the final formulation will exhibit improved elongation of the resultant polymeric rubber by about 10 percent.

Another benefit of this invention is that the formulation will provide a lower Mooney viscosity for the resultant rubber composite. It is expected that the Mooney viscosity will be reduced by about 10 percent over formulations that contain only one silane coupling agent.

A lower Mooney viscosity is expected because of improved compatibilization between the silica and the polymer matrix such that the silica network structure is reduced.

The final rubber formulation can exhibit improved processability by producing a formulation capable of being formed into articles with reduced heating times and curing times by improving compatibilization between the silica and the rubber.

The term "compatibilized silica slurry" can refer to an aqueous suspension of silica with some of its reactive sites rendered hydrophobic via a reaction with at least two coupling agents, the hydrophobic portion of each of the at least two coupling agents being compatible with the natural or synthetic polymer to which the silica is blended.

In the practice of the embodiments, the term "coupling agent" can refer to a coupling agent directly soluble in water or soluble in water with the aid of a co-solvent. The coupling agent as used herein can refer to a silane with a functional group having the capability of chemically reacting with the surface of the silica to bond the silane to the silica. Each silane that is a coupling agent can have and additional functional group capable of compatibilizing with the natural or synthetic polymer into which the silica will be filled.

In one or more embodiments, the coupling agents can include a functional group having the capability of reaction with a rubbery or thermoplastic polymer during the cure or compounding thereof to chemically bind the coupling agent to the polymer. The coupling agent can serve to promote a chemical bonding relationship between the silica surface and compatibilization of natural or synthetic polymers in the latex.

In the case of cross-linkable curable polymers, the coupling agents can serve to promote a chemical bonding relationship between both the silica surface and the cured polymer.

An advantage of the dual coupling agents is that they can both used to control hydrophobicity of the silica surface at reduced sulfur attachments to obtain improved rolling resistance, lower Mooney, and improved scorch resistance.

In one or more embodiments, the silica from the compatibilized silica slurry can be isolated and dried resulting in a partly hydrophobic silica, a compatibilized silica having coupling agents chemically bonded to its surface, which can be used in dry blending operations or reslurried for use as an aqueous suspension.

It has been found that the concepts of the present invention serve to substantially uniformly disperse the compatibilized silica throughout the polymer latex whereby the silica is uniformly and quantitatively dispersed into the polymer once the latex has been coagulated and is readily available to serve as a reinforcing agent and/or filler.

The concepts of the present invention are applicable to a variety of natural and synthetic polymers including particularly rubber and thermoplastic polymers made in latex form.

Typical of the synthetic polymers useful in the practice of the present invention are those prepared by polymerizing or copolymerizing conjugated diene monomers such as butadiene, isoprene, chloroprene, pentadiene, dimethylbutadiene and the like. It is also possible to apply the concepts of the present invention to other polymers made in latex form including, not only conjugated diene-based polymers, but also polymers based on vinyl monomers and combinations of conjugated dienes with vinyl monomers and mixtures thereof.

Suitable vinyl monomers include but are not limited to styrene, alpha-methylstyrene, alkyl substituted styrenes, vinyl toluene, divinylbenzene, acrylonitrile, vinyl chloride, methacrylonitrile, is obutylene, maleic anhydride, acrylic esters and acids, methylacrylic esters, vinyl ethers, vinyl pyridines and the like and mixtures thereof.

Specific polymers can be natural rubber, styrene-butadiene rubber or SBR, acrylonitrile-butadiene rubber or NBR, acrylonitrile-butadiene-styrene polymer or ABS, polybutadienes, polyvinylchloride or PVC, polystyrene, polyvinyl acetate, butadiene-vinyl pyridine polymers, polyisoprenes, polychloroprene, neoprene, styrene-acrylonitrile copolymer (SAN), blends of acrylonitrile-butadiene rubber with polyvinylchloride, and mixtures thereof.

The process can be carried out with these polymers in their latex form and is particularly suited for application to natural rubber lattices and as polymerized lattices.

"Emulsion polymerization", as the term is used herein can refer to the reaction mixture prior to the coagulation stage in an emulsion process. The process of this invention can be carried out with polymer lattices to which other fillers are added, such as carbon black, so that silica-carbon black masterbatches are attainable with uniform high loads of total filler and quantitative incorporation of the fillers.

A plurality of silane coupling agents from about 0.1 weight percent to about 25 weight percent can be blended together simultaneously and then can be added to the silica. The plurality of silane coupling agents can be:
(i) a first silane that is an organosilicon derived from an organic silane having the structure: $Z_1Z_2Z_3Si(CH_2)_yX(CH_2)_ySIZ_1Z_2Z_3$, wherein X is a polysulfide, wherein y is an integer equal to or greater than 1; and wherein $Z_1$, $Z_2$, and $Z_3$ are each independently selected from the group consisting of hydrogen, alkoxy, halogen, and hydroxyl, and (ii) a second silane that is an organosilicon derived from an organic silane having the structure

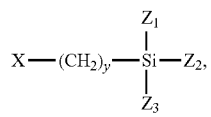

wherein:
(a) X is a functional group selected from the group consisting of: hydrogen, an amino group, a polyamino alkyl group, a mercapto group, a thiocyanato group, an epoxy group, a vinyl group, a halogen, an acryloxy group and a methacryloxy group;
(b) y is an integer equal to or greater than 0; and
(c) $Z_1$, $Z_2$, and $Z_3$ are each independently selected from the group consisting of hydrogen, alkoxy, halogen, and hydroxyl, and combinations thereof.

The silanes can be added to the silica forming a compatibilized silica. The compatibilized silica can be dry or wet blended with any natural or synthetic polymer.

In addition to the polymers already recited the compatibilized silica can be blended with polyolefins, and poly-alpha-olefins, polyesters, polyamides, polycarbonates, polyphenylene oxides, polyepoxides, polyacrylates, and copolymers of acrylates and vinyl monomers. Synthetic polyolefins include homopolymers, copolymers, and other comonomer combinations prepared from straight chain, branched, or cyclic-alpha-monoolefins, vinylidene olefins, and nonconjugated di- and triolefins, including 1,4-pentadienes, 1,4-hexadienes, 1,5-hexadienes, dicyclopentadienes, 1,5-cyclooctadienes, octatrienes, norbornadienes, alkylidene norbornenes, vinyl norbornenes, etc. Examples of such polymers include polyethylenes, polypropylenes, ethylene-propylene copolymers, ethylene-.alpha.-olefin-nonconjugated diene terpolymers (EPDMs), chlorinated polyethylenes, polybutylene, polybutenes, polynorbornenes, and poly .alpha.-olefin resins and blends and mixtures thereof.

In one or more embodiments, a silica is first treated with at least two coupling agents in an aqueous solution to form a compatibilized silica slurry. As the silica employed, use can be made of a number of commercially available amorphous silica of either the precipitated or fumed type having finely divided particle sizes and high surface area. The size of the silica particles can vary within relatively wide ranges, depending somewhat on the end use of the silica-filled or silica-reinforced polymer. In general, use can be made of silica having average particle sizes ranging from 1 nm to 120 nm and corresponding surface areas of 15-700 m.sup.2/g.

The finely divided silica is thus formed into an aqueous slurry and treated with a solution of coupling agents which chemically bind to different sites on the silica surface.

In general, such silicon compounds contain at least one, but no more than three, readily hydrolyzable groups bonded directly to the silicon atom. The hydrolyzable groups commonly employed in such coupling agents can be: halogens, hydrogen, hydroxyl, lower alkoxy groups such as methoxy, ethoxy, propoxy, and like groups.

Also attached directly to the silicon atom are one to three organic groups compatible with the natural or synthetic polymer to which the silica is to be added, and the coupling agent can have at least one organic group containing a functional group capable of chemical reaction with the natural or synthetic polymer to which the silica is to be added. Such functional groups can include but are not limited to: amine groups, polyamino alkyl groups, mercapto groups, carbonyl groups, hydroxy groups, epoxy groups, halogens and ethylenically unsaturated groups.

The choice of functional group will be determined by the particular polymer and the particular method of fabrication of the polymer-silica masterbatch. For example, if this process is applied to a styrene-butadiene rubber to provide a silica masterbatch which will be cured via cross-linking reactions involving sulfur compounds, can utilize as the two coupling agents, organosilicon compounds wherein at least one organic group has mercapto, polysulfide, thiocyanato (—SCN), and a halogen and/or amino functionality. Correspondingly, if the silica filled polymer is to undergo a peroxy type of curing reaction, it can have as one of the two organosilicon compounds, at least one organic group with ethylenic unsaturation or epoxy groups.

Representative of coupling agents imparting compatibilization to the natural and synthetic polymers can be those from the groups consisting of: trialkylsilanes, dialkylsilanes, trialkylalkoxysilanes, trialkylhalosilanes, dialkyalkoxysilanes, dialkyldialkoxysilanes, dialkylalkoxyhalosilanes, trialkylsilanols, alkyltrialkoxysilanes, alkyldialkoxysilanes, alkyldialkoxyhalosilanes, and monoalkylsilanes wherein the alkyl group is a C.sub.1 to C.sub.18 linear, cyclic, or branched hydrocarbon or combinations thereof, and wherein for some particular embodiments one or two alkyl groups can be replaced with a phenyl or benzyl group or one to two alkyl groups can be replaced with a phenyl, benzyl, or alkoxy substituted alkyl group.

A somewhat related group of coupling agents which can likewise be used can be bispolysulfides. These organosilicon compounds can be described as bis(trialkoxysilylalkyl) polysulfides containing 2 sulfur atoms to 8 sulfur atoms in which the alkyl groups are C.sub.1-C.sub.18 alkyl groups and the alkoxy groups are C.sub.1-C.sub.8 alkoxy groups.

Representative of such coupling agents which are commercially available can include: (gamma-aminopropyl) trimethoxysilane, (gamma-aminopropyl) triethoxysilane, (gamma-hydroxypropyl) tripropoxysilane, (gamma-mercaptopropyl) triethoxysilane, (gamma-aminopropyl) dimethylethoxysilane, (gamma-aminopropyl) dihydroxymethoxy-silane, (glycidylpropyl (trimethoxysilane, [(N-aminoethyl) gamma-aminopropyl]-triethoxysilane, (gamma-methacryloxy-propyl) triethoxysilane, (gamma-methacryoxy-propyl) trimethoxysilane, (beta-mercaptoethyl) triethoxysilane, [gamma-(N-aminoethyl)propyl]trimethoxysilane, N-methylaminopropyltrimethoxysilane, (gamma-thiocyanatopropyl) triethoxysilane, bis-(3-triethoxythiopropyl)tetrasulfide, vinyltriethoxysilane, vinylphenylmethylsilane, vinyldimethylmethoxysilane, divinyldimethoxysilane, divinylethyldimethoxysilane, dimethylvinylchlorosilane, and the like.

In carrying out the reaction between coupling agents, such as organosilanes, and the silica, the coupling agents can be dissolved in a lower alkanol such as propanol or ethanol at a pH below 9 to which water is slowly added, either continuously or incrementally, to commence hydrolysis of the hydrolyzable groups contained in the coupling agents to form the corresponding silanol. To assist in the hydrolysis of an alkoxy group, a pH in the range of 3.5-5.0 is desirable to minimize side reactions such as oligomerization of the organosilane, and can be maintained by use of dilute mineral acid such as hydrochloric or weak organic acids such as acetic acid. To assist in the hydrolysis of a hydride group more alkaline conditions can be needed and bases such as KOH, NaOH, $NH_4OH$, triethylamine, or pyridine can be employed to maintain a pH of 8-9. The choice of base will be dependent on the chemical nature of the specific latex to which the silica slurry is added.

When the hydrolyzable group is halogen, the organohalosilane can be mixed directly with the aqueous silica dispersion rather than carrying out a separate hydrolysis step. The hydrolyzed coupling agent can then be blended with an aqueous slurry of the finely divided silica whereby the silanol groups present in the coupling agent chemically react with the surface of the silica to form a siloxane bond (Si—O—Si) between the coupling agent and the silica surface. The pH at this step can be maintained at approximately 5.5-6.5 to favor reaction with the silica surface while allowing some condensation reaction between the silane molecules bonding to the surface of the silica. Depending on the particular silica and the initial pH of the water, this pH is attained without addition of further reagents.

The concentration of the silica in the slurry with which the hydrolyzed coupling agents is blended can be varied within relatively wide limits.

In general, use can be made of silica slurries containing about 1 percent to about 30 percent by weight silica based on the weight of the slurry. In one or more embodiments, the slurry concentration ranges from about 10 percent to about 20 percent by weight silica based on the weight of the slurry. Temperature and reaction time can be varied within wide limits. In general, temperatures ranging from ambient temperatures up to about 200 degree Fahrenheit can be used. Similarly, the time for effecting the reaction between the hydrolyzed coupling agent and the silica can be varied within relatively wide limits, generally ranging from about 4 hours to about 48 hours, depending somewhat on the temperature employed.

The amount of the coupling agents employed can likewise be varied within relatively wide limits, depending in part on the amount of silica to be blended with the natural or synthetic polymer and the molecular weight of the coupling agent. Use can be made of coupling agents, wherein the total amount of the at least two coupling agents is within the range of about 1 part to about 25 parts of coupling agents per 100 parts by weight of silica.

The amount of coupling agents to be used can be defined in terms of the actual weight percent of organosilicon residing on the silica surface.

It has been found that to achieve greater than 90 percent by weight silica incorporation into a polymer, the weight percent of organosilicon on the surface of the silica must be in the range of at least 1.0-2.5, that is, a minimum of 1.0-2.5 grams of organosilicon from the silane is bound to 100 grams of silica charged to the slurry. For enhanced compatibility in dry mix or for additional chemical reaction with the natural or synthetic polymers, it can be desirable to bind greater than 2 percent by weight of organosilicon residue per weight of silica.

After the silica has been treated with the coupling agents, the treated silica slurry can then be blended with the natural or synthetic polymer latex with sufficient agitation to uniformly distribute the treated silica throughout the latex.

The silica treated latex is stable and can be fed directly to a coagulation process, where coagulation aids conventional for that type of natural or synthetic polymer are employed.

The stability of the latex will depend, however, on maintaining a proper pH range which is variable with the particular emulsion process. For example, when the emulsion process is a cold SBR process or cold NBR process utilizing anionic surfactants, the pH can be maintained at 8.0-9.5. However, if the process is a hot carboxylated SBR emulsion process or hot carboxylated NBR emulsion process using cationic surfactants, the pH can be kept between 3.5 and 5.5 to ensure stability of the latex.

The amount of the silica added to the latex can vary within wide ranges, depending in part on the coupling agents employed, the nature of the polymer, the use of other fillers such as carbon black, and the end use to which that polymer is subjected. In general, good results are obtained where the silica is added in an amount within the range of about 5 percent to about 80 percent by weight based upon the weight of the solids in the latex.

During coagulation, the compatibilized silica remains dispersed, intimately admixing and adhering to the polymer particles resulting in a substantially uniform distribution of the silica particles within the particles of the polymer. Other processing aids can be added to polymer latex such as plasticizers, extender oils, and antioxidants can be added at the latex stage along with the compatibilized silica slurry without modifying equipment and process conditions, or adversely affecting the dispersion of the silica during coagulation and dewatering.

The embodiments can provide a significant economic advantage in making rubber tires, in that once the latex is coagulated to recover the polymer containing the compatibilized silica, the residual liquid phase contains only small amounts of the compatibilized silica which were not incorporated into the polymer.

The compatibilized silica, the partially hydrophobic silica, isolated from the compatibilized silica slurry by decantation and drying is characterized as having clusters of organosilicon oligomers on the surface of the silica. This clustering is the result of bonding to the silica surface oligomers of the organosilanes, that is, the organosilane undergoes some condensation reaction with itself to form an oligomeric structure which chemically binds to the silica surface via the Si—O—Si bonds.

The clusters of organosilane oligomers are identified by NMR as stated by M. Pursch, et. al. and as disclosed in Anal. Chem. 68, 386 and 4107, 1996. The spectrum was acquired with a 7 mms contact time, 5.0 kHz spinning speed, and a 33 kHz r.f. field on both $^1H$ and $^{29}Si$. The chemical shift scale is relative to the resonance for tetramethylsilane (TMS) at 0.0 ppm. The assignment of the resonances was made by comparison with previous spectral assignments of silanes bound to silica surfaces as described in Pursch. Two main groups of resonances are seen. The resonances of the silicon atoms on the surface of the silica are represented by the Q sites, $Q^2$, $Q^3$, and $Q^4$ at −93.7 ppm, −102.5 ppm, and −112.0 ppm, respectively. The T sites, $T^2$ and $T^3$, at −57.5 and −67.9 ppm respectively, correspond to silicon atoms of the silanes that are chemically bonded to the silica surface.

The different T sites are characterized as to the degree of oligomerization or cross-linking of the silanes on adjacent silicon atoms with each other. That is, a $T^1$ site represents a silane molecule chemically bonded only to the silica surface. A $T^2$ site represents a silane molecule chemically bonded to a Si atom on the silica surface and to one adjacent silane or a silane chemically bonded to two adjacent surface Si atoms, i.e. partially cross-linked structures; while a $T^3$ site represents a silane molecule chemically bonded to a Si atom in the silica surface and to 2 adjacent silanes or a silane chemically bonded to three surface Si atoms, i.e. completely cross-linked structure. Pursch et. al. have used the relationship of the intensity of the T sites to define an extent of oligomerization or cross-linking parameter referred to as parameter Q, and is defined below:

The compatibilized silica of this invention has a parameter Q value of greater than 80 percent while prior art and commercial silane treated silicas measure a Q value of less than 75 percent. The higher Q value for the compatibilized silica of this invention is due to the greater proportion of $T^3$ sites, that is, a higher concentration of oligomerized or fully cross-linked silane is present. The compatibilized silica of this invention can be described as having a $T^3/T^2$ ratio of 0.75 or greater. Commercial silane coated silica and silica described in prior art publications have $T^3/T^2$ ratios of 0.6 or less. The higher degree of cross-linking in the silica of this invention can be explained as having an average tetrameric structure of silane on the surface in contrast to commercial silica where the average structure ranges from monomeric to trimeric.

While not wishing to be bound by any theory, it is believed that the average tetrameric structure of the silane bound to the silica surface of the compatibilized silica is due to the aqueous reaction medium used in its preparation. By controlling the pH of the aqueous phases, hydrolysis and oligomerization reactions can compete with adsorption and chemical reaction of the silanol groups on the silica surface. Thus more organosilane binds to the surface in oligomeric form.

It can be understood that various changes and modifications can be made in the details of formulation, procedure and use. The following examples are provided by way of illustration and not by way of limitation of the practice of the present embodiments.

Chemicals used to demonstrate the concepts of these embodiments are as follows:

Silquest™ A-189 Momentive is (gamma-mercapto) propyltrimethoxysilane.

Hi-Sil™ 233 (PPG) is a precipitated, hydrated amorphous silica in powder form, ultimate particle size of 0.019 microns.

Octyltrimethoxy silane OTES is a Dow Corning™ product Z-6341 with a CAS number 2943-75-1 and a linear formula $CH_3(CH_2)_7Si(OC_2H_5)_3$ and a molecular weight of 276.49.

Trimethoxy silane is also available from Dow Corning with a CAS number of 2487-90-3 and a molecular formula of $C_3H_{10}O_3Si$.

Dodecylmethyldiethoxy silane is available from American Custom Chemicals Corporation of San Diego with a CAS number 60317-40-0 and a linear formula $C_{17}H_{38}O_2Si$ and a molecular weight of 302.57302.

Disiloxane, hexamethoxy also known as Hexamethoxy silane has a Molecular Formula: $C_6H_{18}O_7Si_2$ Molecular Weight: 258.37392.

EXAMPLE 1

Preparation of an SBR-Silica-Carbon Black Masterbatch

A. Preparation of Compatibilized Silica Slurry

An aqueous solution of silane was prepared by charging to a vessel 25.1 g Silquest™ A-189 (Momentive), with 30 grams of octyltrimethoxy silane from Gelest and 27 g isopropanol, 1.1 g of glacial acetic acid and 27 g water. The initially cloudy mixture was agitated at high speed and room temperature until clear, about 10-20 minutes, after which an additional 28 g of water were added which made the mixture cloudy. Agitation was continued for about 15-20 minutes until the solution cleared.

To a separate vessel equipped with a stirrer 16 lb of water and 4.05 lb of fine-particle, dry silica, Hi-Sil™ 233 were charged and agitated for about 15 minutes to wet and disperse the silica. The aqueous solution of silane was then added with continued agitation, the pH was increased to 7.5-8.0 with 25 percent sodium hydroxide and the blend was heated to 170 degrees Fahrenheit. The temperature was maintained at 170 degrees Fahrenheit for about 4 hours then allowed to cool to 140 degrees Fahrenheit. At this point the compatibilized silica slurry can be added to the latex stage of a continuous emulsion process or fed batch wise to a concentrated polymer latex.

B. Blend Compatibilized Silica Slurry with SBR Latex

Slurry as prepared in Step A above was charged to an agitated vessel containing a mixture of 41.1 lb of SBR latex containing 21.9 weight percent 1502-type rubber and 0.3 lb of antioxidant emulsion containing 13.4 weight percent Santoflex™ 134 held at 140 degrees Fahrenheit. To this initial mixture was also charged 21.8 lb of hot carbon black slurry containing 6.2 weight percent N234-type carbon black and 2.74 lb of hot oil emulsion containing 65.6 weight percent Sundex™ 8125. The final mixture was agitated for 30 minutes at 140 degrees Fahrenheit.

The above latex blend was slowly added to a larger, agitated vessel which initially contained 40-45 lb of water and sufficient sulfuric acid to give a pH of 4. The rates of addition of latex blend and sulfuric acid were varied to maintain the pH of the resulting coagulation serum in the range of 4-5 over the 30-40 minutes that the latex blend was added. An additional 30-40 minutes of mix time and additional acid were used as needed to allow product particle size to grow and to clear the serum of free latex as is commonly done by those familiar with the art. The wet masterbatch particle or crumb size achieved by this coagulation was similar to that obtained from coagulations without silica. Visual inspection and chemical analysis of the dried masterbatch showed that essentially all solid and liquid components added to the latex mixture were absorbed and uniformly distributed. Silica absorption was 97-98 percent of charge as estimated by ash analysis.

EXAMPLE 2

Preparation of an SBR-Silica-Carbon Black Masterbatch

A. Preparation of Compatibilized Silica Slurry

An aqueous solution of silane was prepared by charging to a vessel 50.2 grams Silquest™ A-189 plus 60 grams of octyltrimethoxy silane, 55 g isopropanol, 2.2 g of glacial acetic acid and 55 g water. The initially cloudy mixture was agitated at high speed and room temperature until clear, about 10-20 minutes, after which an additional 55 g of water were added which made the mixture cloudy. Agitation was continued for about 15-20 minutes until the solution cleared.

To a separate vessel equipped with a stirrer 16 lb of water and 4.05 lb of fine-particle, dry silica, Hi-Sil™ 233, were charged and agitated for about 15 minutes to wet and disperse the silica. The aqueous solution of silane was then added with continued agitation, the pH was increased to 7.5-8.0 with 25 percent sodium hydroxide and the blend was heated to 170 degrees Fahrenheit. The temperature was maintained at 170 degrees Fahrenheit for about 4 hours then allowed to cool to 140 degrees Fahrenheit. At this point the compatibilized silica slurry can be added to the latex stage of a continuous emulsion process or fed batch wise to a concentrated polymer latex.

B. Blend Compatibilized Silica Slurry with SBR Latex

Slurry as Prepared in Step 2A Above was Charged to an Agitated Vessel Containing a Latex Mixture as Described in The final masterbatch mixture was agitated for 30 minutes at 140 degrees Fahrenheit.

The above latex blend was coagulated as in Example 1. The wet masterbatch particle or crumb size achieved by this coagulation was similar to or slightly larger than that obtained from coagulations without silica. Visual inspection and chemical analysis of the dried masterbatch showed that essentially all solid and liquid components added to the latex mixture were absorbed and uniformly distributed. Silica absorption was about 99 percent of charge as estimated by ash analysis.

EXAMPLE 3

Preparation of an SBR-Silica Masterbatch

Compatibilized Silica Slurry as prepared in Example 2; Step A above was charged to an agitated vessel containing a latex mixture prepared from 41.1 lb of SBR latex containing 21.9 weight percent 1502 SBR and 193 g of Santoflex 134 solution 1 (13.4 weight percent) held at 140 degrees Fahrenheit. To this mixture was also charged 2.74 lb of hot oil emulsion containing 65.6 weight percent Sundex 8125. The mixture was agitated for an additional 35 minutes maintaining 140 degrees Fahrenheit, after which the hot latex was slowly charged to another vessel for coagulation per the procedure of Example 1B. The dewatered crumb was similar in particle size to that of SBR without silica. Visual inspection and chemical analysis of the dry crumb showed that essentially all of the oil and silica added to the latex were absorbed and uniformly distributed. Silica absorption was 98-99 percent of the charge as estimated by ash analysis.

EXAMPLE 4

Preparation of an NBR-Silica Masterbatch

A. Preparation of Compatibilized Silica Slurry

An aqueous solution of two silanes was prepared by charging to a vessel 12 grams of Silquest™ A-189, and 13.4 grams of hexamethoxy silane, 13 grams isopropanol, 0.5 grams of glacial acetic acid and 13 grams water. The initially cloudy mixture was agitated at high speed and room temperature until clear, about 10-20 minutes, after which an additional 13 g of water were added which made the mixture cloudy. Agitation was continued for about 15-20 minutes until the solution cleared.

To a separate vessel equipped with a stirrer 6.4 lb of water and 1.4 lb of fine-particle, dry silica, Hi-Sil™ 233 were charged and agitated for about 15 minutes to wet and disperse the silica. The aqueous solution of silane was then added with continued agitation, the pH was increased to 7.5-8.0 with 25 percent sodium hydroxide and the blend was heated to 170 degrees Fahrenheit. The temperature was maintained at 170 degrees Fahrenheit for about 4 hours then allowed to cool to 140 degrees Fahrenheit. At this point the compatibilized silica slurry can be added to the latex stage of a continuous emulsion process or fed batch wise to a concentrated polymer latex.

B. Blend Compatibilized Silica Slurry with NBR Latex

Slurry as prepared in Step A above was charged to an agitated vessel containing a mixture of 29.2 lb of NBR latex containing 24.0 weight percent Nycryl™ made by Lion Copolymer of Baton Rouge, La., 40-5 rubber and 216 grams of antioxidant emulsion containing 14.7 weight percent Agerite Geltro™. (Vanderbilt Chemical) held at 140 degrees Fahrenheit. To this initial mixture was also charged 34.4 lb of hot carbon black slurry containing 6.1 weight percent N234-type carbon black. The final mixture was agitated for 30 minutes at 140 degrees Fahrenheit.

The above latex blend was slowly added to a larger vessel which initially contained 25 lb of water and sufficient sulfuric acid to give a pH of 4. The coagulation was completed as in previous examples. The wet masterbatch crumb size achieved by this coagulation was similar to that obtained from NBR coagulations without silica. Visual inspection and chemical analysis of the dried masterbatch showed that essentially all solid and liquid components added to the latex mixture were absorbed and uniformly distributed. Silica absorption was 97-98 percent of charge as estimated by ash analysis.

COMPARATIVE EXAMPLE

Preparation of a SBR Silica Carbon Black Masterbatch without the Two Silane Coupling Agents A. Preparation of Silica Slurry To a vessel equipped with a stirrer 5.4 lb of water and 1.35 lb of fine-particle, dry silica, Hi-Sil™ 233 were charged, agitated for about 15 minutes and heated to 140 degrees Fahrenheit.

B. Blend Silica Slurry with SBR Latex

Slurry, as prepared in Step A above, was charged to an agitated vessel containing a mixture of 41.1 lb of SBR latex containing 21.9 weight percent 1502-type rubber and 183 g of antioxidant emulsion containing 13.4 weight percent Santoflex™. 134 held at 140 degrees Fahrenheit. To this initial mixture was also charged 65.3 lb of hot carbon black slurry containing 6.2 weight percent N234-type carbon black and 2.74 lb of hot oil emulsion containing 65.6 weight percent Sundex™ 8125. The final mixture was agitated for 30 minutes at 140 degrees Fahrenheit.

The above latex blend was coagulated as in Example 1. However, additional agitation time and acid did not produce the usual result. The average size of the masterbatch crumb particles was greatly reduced compared to a coagulation without silica, this fine particle crumb would not be recoverable in most commercial dewatering equipment. The aqueous phase or coagulation serum did not become clear at low pH as normally occurs without silica due to a remnant of free silica dispersed in the water. In the absence of agitation, the free silica settled to the bottom of the vessel.

Visual inspection and chemical analysis of the dried masterbatch showed that the carbon black and oil added to the latex mixture were absorbed and uniformly distributed. Silica absorption was about 40 percent of charge, as estimated by ash analysis, and the silica distribution was very non-uniform due to settling and entrapment of free silica on the surface of masterbatch crumb particles.

EXAMPLE 5

Preparation of a Natural Rubber-Silica Masterbatch Blend Compatibilized Silica Slurry with NR Latex Compatibilized silica slurry as prepared in Step A; of Example 4 above was charged at 3.33 pounds to an agitated vessel containing a mixture of 5.17 lb of latex containing 58.0 weight percent natural rubber and 93 grams of antioxidant emulsion containing 14.7 weight percent Agerite Geltrol. (Vanderbilt Chemical). This mixture was agitated for 30 minutes at 140 degrees Fahrenheit.

The above latex blend was slowly added to a larger vessel which initially contained 8 lb of water and sufficient sulfuric acid to give a pH of 4. The coagulation was completed as in previous examples. The wet masterbatch crumb size achieved by this coagulation was similar to that obtained from SBR and NR coagulations without silica. Visual inspection and chemical analysis of the dried masterbatch showed that essentially all the silica added to the latex mixture was absorbed and uniformly distributed. Silica absorption was 98-99 percent of charge as estimated by ash analysis.

EXAMPLE 6

Preparation of an SBR-Silica-Carbon Black Masterbatch

A. Preparation of Compatibilized Silica Slurry

An aqueous solution of silane was prepared by charging to a vessel 40.1 g Silquest.

A-189 (Momentive) with 10 grams dodecylmethyldiethoxy silane, 27 g isopropanol, 1.1 g of glacial acetic acid and 27 g water. The initially cloudy mixture was agitated at high speed and room temperature until clear, about 10-20 minutes, after which an additional 28 g of water were added which made the mixture cloudy. Agitation was continued for about 15-20 minutes until the solution nearly cleared. The pH of the solution was 3.5.

To a separate vessel equipped with a stirrer 16 lb of water and 4.05 lb of fine-particle, dry silica, Hi-Sil™ 233 were charged and agitated for about 15 minutes to wet and disperse the silica. The aqueous solution of silane was then added with continued agitation, the pH was measured to be 6.0-6.5. The blend was heated to 170 degrees Fahrenheit. The temperature was maintained at 170 degrees Fahrenheit for about 4 hours then allowed to cool to 140 degrees Fahrenheit. At this point the compatibilized silica slurry can be added to the latex stage of a continuous emulsion process or fed batch wise to a concentrated polymer latex.

B. Blend Compatibilized Silica Slurry with SBR Latex

Slurry as prepared in Step A above was charged to an agitated vessel containing a mixture of 41.1 lb of SBR latex containing 21.9 weight percent 1502-type rubber and 0.3 lb of antioxidant emulsion containing 13.4 weight percent Santoflex. 134 held at 140 degrees Fahrenheit. To this initial mixture was also charged 21.8 lb of hot carbon black slurry containing 6.2 weight percent N234-type carbon black and 2.74 lb of hot oil emulsion containing 65.6 weight percent Sundex® 8125. The final mixture was agitated for 30 minutes at 140 degrees Fahrenheit.

The above latex blend was slowly added to a larger, agitated vessel which initially contained 40-45 lb of water and sufficient sulfuric acid to give a pH of 4. The rates of addition of latex blend and sulfuric acid were varied to maintain the pH of the resulting coagulation serum in the range of 4-5 over the 30-40 minutes that the latex blend was added. An additional 30-40 minutes of mix time and additional acid were used as needed to allow product particle size to grow and to clear the serum of free latex as is commonly done by those familiar with the art. The wet masterbatch particle or crumb size achieved by this coagulation was similar to that obtained from coagulations without silica.

Visual inspection and chemical analysis of the dried masterbatch showed that essentially all solid and liquid components added to the latex mixture were absorbed and uniformly distributed. Silica absorption was 98 percent of charge as estimated by ash analysis.

It should be noted in various embodiments of the invention that the polymer silica masterbatch can include a natural rubber latex or a synthetic rubber latex or a thermoplastic polymer or a resin polymer, or combinations thereof. The natural rubber latex can be Guayule available from Yulex.

EXAMPLE 7

Isolation of the Compatibilized Silica from the Aqueous Suspension

Silica slurry as prepared in Example 6 was separated from the excess water by decantation. The wet silica was placed in an open dish and heated in an oven at about 170 degrees Fahrenheit overnight. The silica after drying was in chunk form and was crushed to a powder. The powdered silica was dried an additional 15-30 minutes at 300 degrees Fahrenheit.

While these embodiments have been described with emphasis on the embodiments, it should be understood that within the scope of the appended claims, the embodiments can be practiced other than as specifically described herein.

What is claimed is:

1. A polymer silica masterbatch comprising: a blend of a natural polymer or a synthetic polymer, the synthetic polymer is selected from the group consisting of: styrene-butadiene rubber, acrylonitrile-butadiene rubber, acrylonitrile-butadiene-styrene polymer, styrene-acrylonitrile copolymer, polybutadiene, polyisoprene, neoprene, polybutadiene-isoprene, and mixtures thereof, the natural polymer or the synthetic polymer with 5 weight percent to 80 weight percent of a compatibilized silica having 0.1 weight percent to 25 weight percent of the compatibilized silica weight percent of a plurality of silane coupling agents chemically bound to a surface of the compatibilized silica, wherein the plurality of silane coupling agents are present as an average tetrameric structure having a $T^3/T^2$ ratio of 0.75 or greater as measured by NMR, and wherein the plurality of silane coupling agents consist of:

a. a polysulfide silane comprising an organosilicon derived from an organic silane having the structure: $Z_1Z_2Z_3Si(CH_2)_yX(CH_2)_ySIZ_1Z_2Z_3$, wherein X is a polysulfide, wherein y is an integer equal to or greater than 1; and wherein $Z_1$, $Z_2$, and $Z_3$ are each independently selected from the group consisting of hydrogen, an alkoxy, a halogen, and a hydroxyl; and b. a non-polysulfide silane comprising an organosilicon derived from an organic silane having the structure

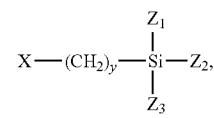

wherein:

(i) X is a functional group selected from the group consisting of: hydrogen, an amino group, a polyamino alkyl group, a mercapto group, a thiocyanato group, an epoxy group, a vinyl group, a halogen, an acryloxy group and a methacryloxy group;

(ii) y is an integer value equal to or greater than 0; and (iii) $Z_1$, $Z_2$, and $Z_3$ are each independently selected from the group consisting of: hydrogen, an alkoxy, a halogen, and a hydroxyl forming a masterbatch with increased incorporation and dispersion of silica in the masterbatch.

2. The polymer silica masterbatch of claim 1, wherein the compatibilized silica has a $T^3/T^2$ ratio of 0.9 or greater.

3. The polymer silica masterbatch of claim 1, wherein the compatibilized silica has a total weight from 0.1 weight percent to 25 weight percent of the plurality of silane coupling agents chemically bound to the surface of the compatibilized silica based on the total weight of the compatibilized silica.

4. The polymer silica masterbatch of claim 1, wherein the plurality of silane coupling agents chemically bound to the surface of the compatibilized silica are derived from organosilicons having three readily hydrolyzable groups attached directly to a silicon atom of the organosilicon, and further wherein each organosilicon has at least one organic group attached directly to the organosilicon's silicon atom.

5. The polymer silica masterbatch of claim 4, wherein the at least one organic group attached directly to the organosilicon's silicon atom contains at least one functional group.

6. The polymer silica masterbatch of claim 1, wherein the natural polymer or the synthetic polymer is a natural rubber latex, a synthetic rubber latex, a thermoplastic polymer, a resin polymer, or combinations thereof.

7. The polymer silica masterbatch of claim 6, wherein the natural polymer or the synthetic polymer is a polymer selected from the group consisting of: a polymer of a conjugated diene, a polymer of a vinyl monomer, and a polymer of a conjugated diene and a vinyl monomer.

* * * * *